Feb. 29, 1944.   R. A. OPENSHAW   2,342,964
BALER PRESS
Original Filed Aug. 29, 1939   4 Sheets-Sheet 1
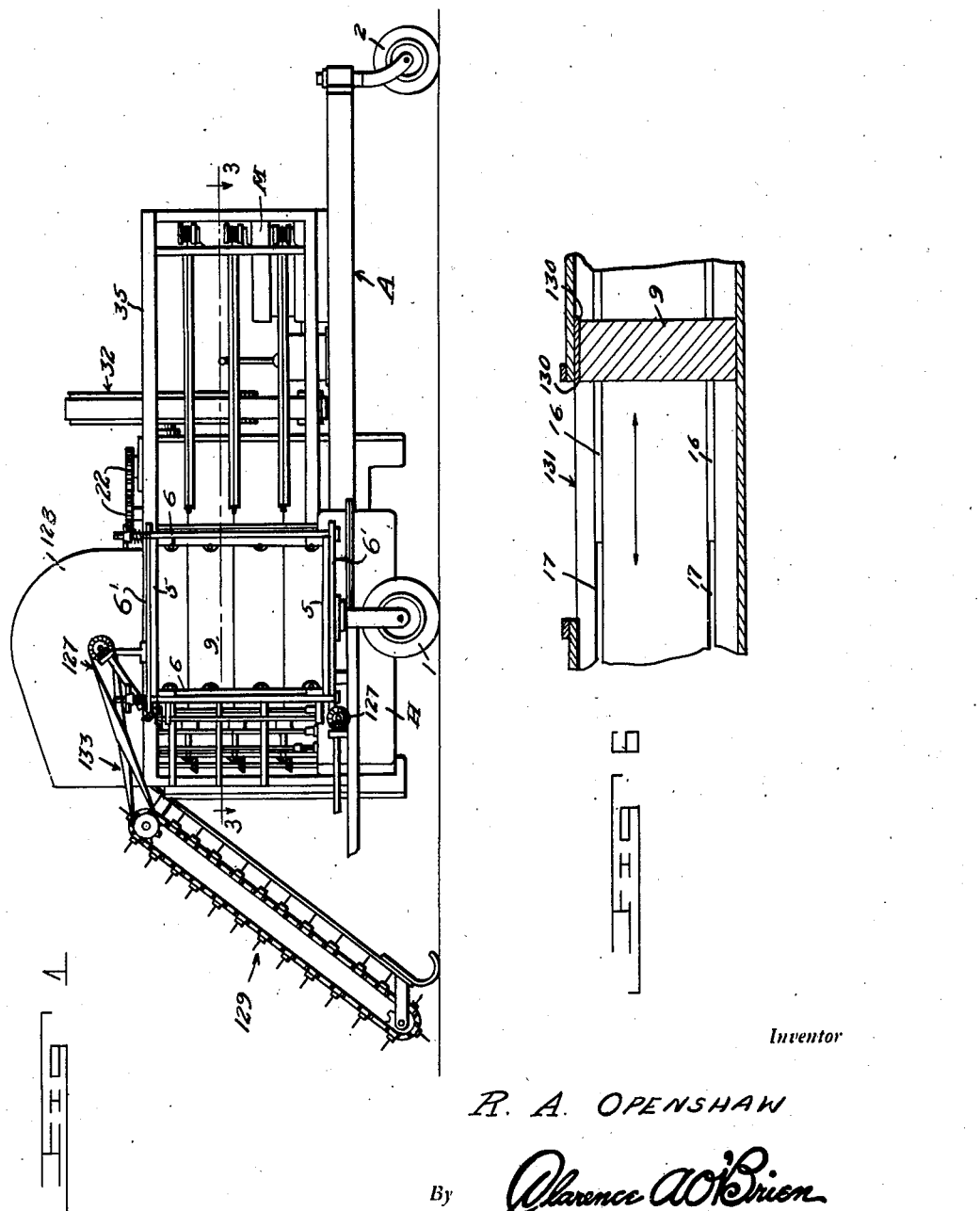
Inventor
R. A. OPENSHAW
By Clarence A. O'Brien
and Harvey B. Jacobson
Attorneys Feb. 29, 1944.   R. A. OPENSHAW   2,342,964
BALER PRESS
Original Filed Aug. 29, 1939   4 Sheets-Sheet 2
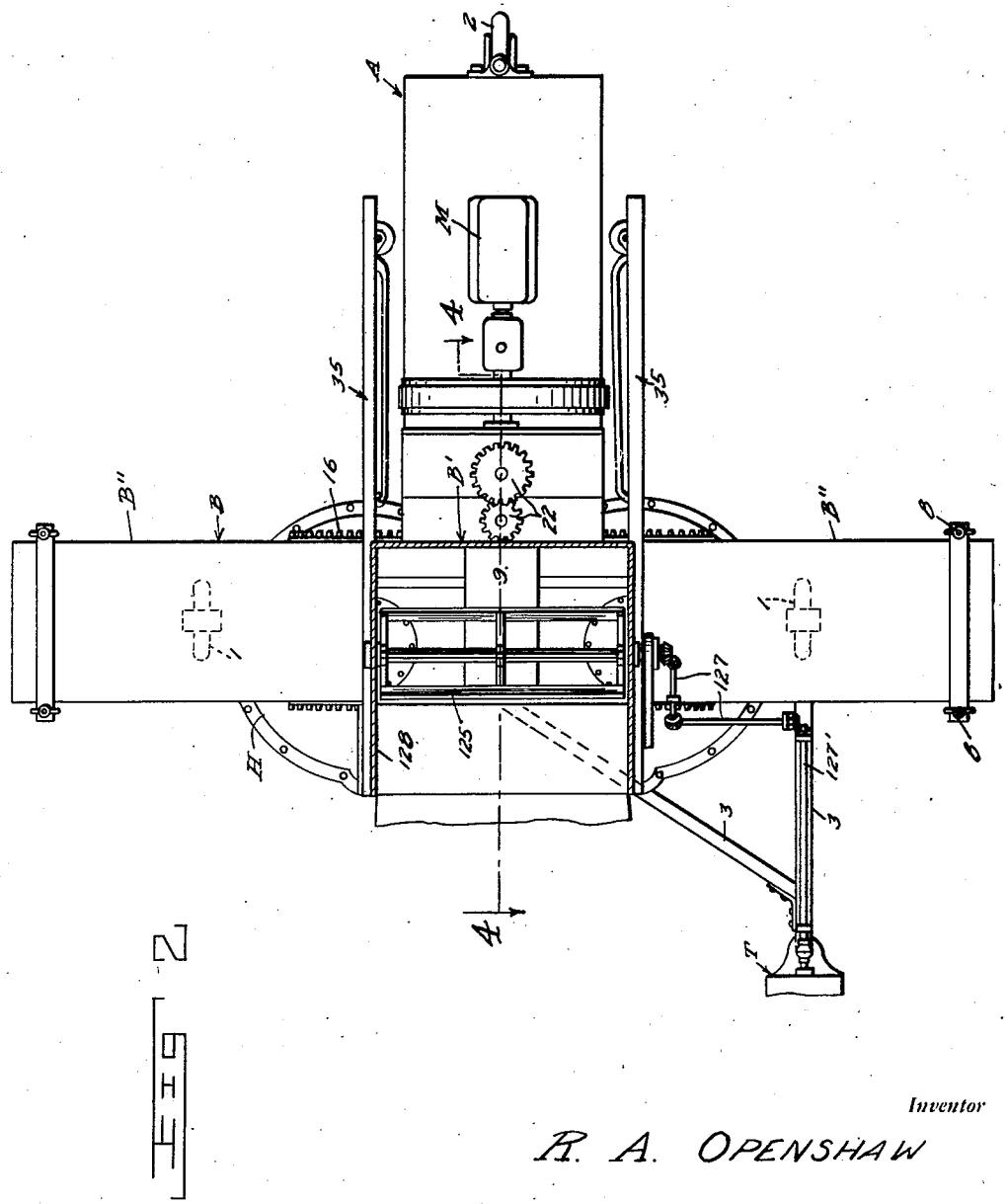
Inventor
R. A. OPENSHAW
By Clarence A. O'Brien
and Harvey B. Jacobson
Attorneys

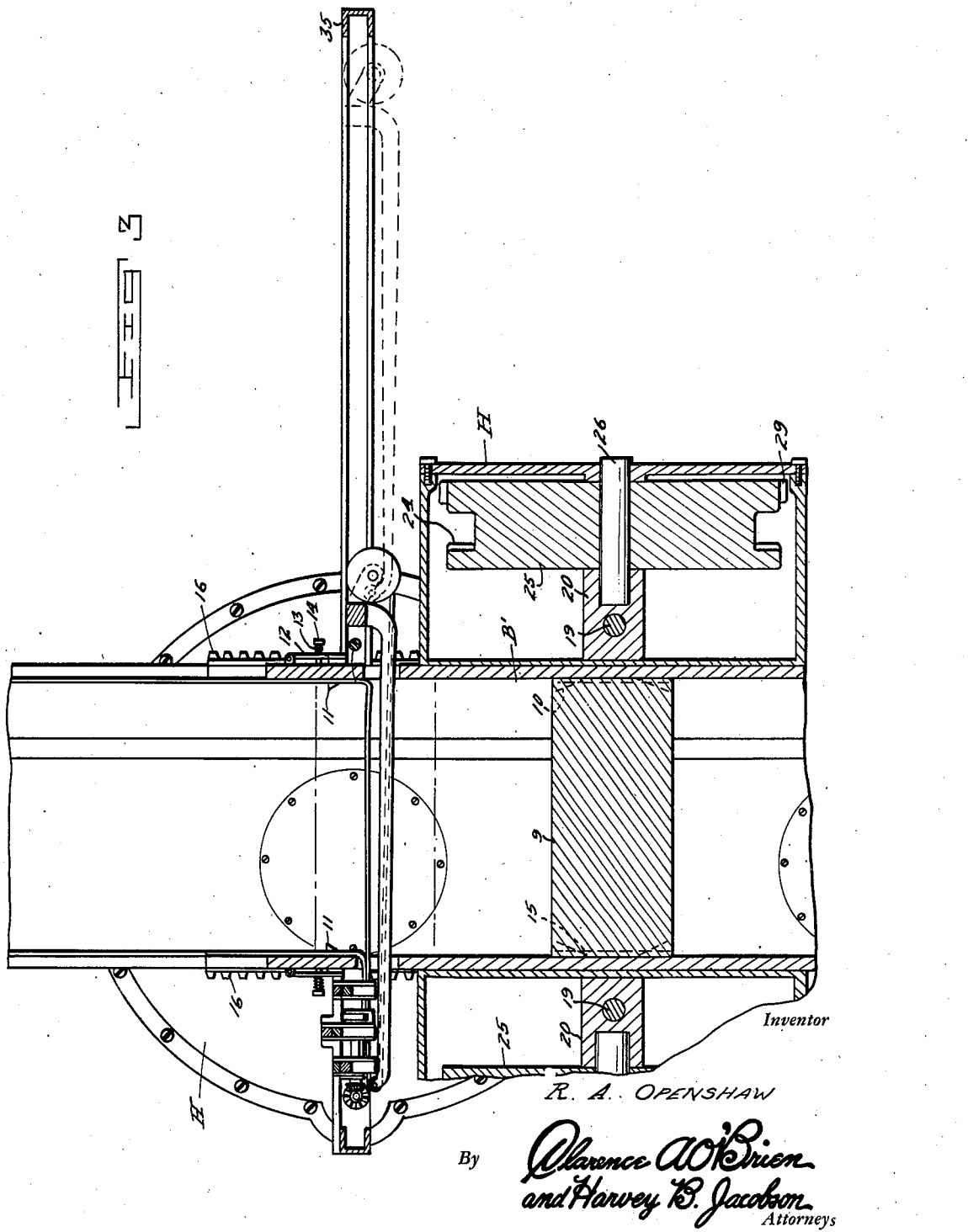

Feb. 29, 1944. R. A. OPENSHAW 2,342,964
BALER PRESS
Original Filed Aug. 29, 1939 4 Sheets-Sheet 4
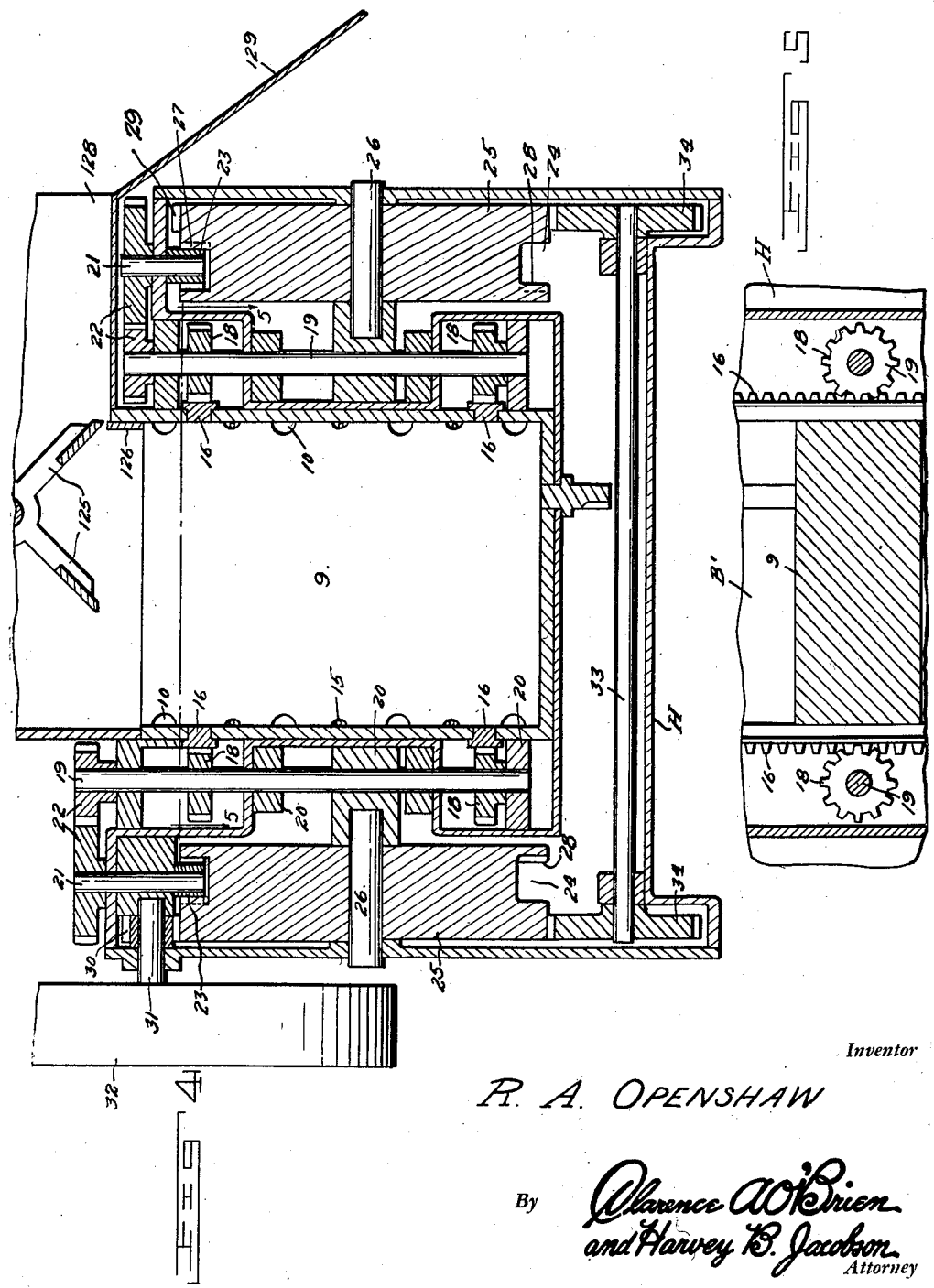
Inventor
R. A. OPENSHAW
By Clarence A. O'Brien
and Harvey B. Jacobson
Attorney Patented Feb. 29, 1944

2,342,964

UNITED STATES PATENT OFFICE 2,342,964

BALER PRESS

Ralph A. Openshaw, Mesa, Ariz.

Original application August 29, 1939, Serial No. 292,470. Divided and this application September 8, 1942, Serial No. 457,662

2 Claims. (Cl. 100—5)

This is a division of my co-pending application Serial No. 292,470, filed August 29, 1939, Patent No. 2,294,929, dated September 8, 1942.

This invention relates to a baler press for baling hay, straw, etc., the general objects of the invention being to provide a press having a double action plunger for forming two bales as it moves back and forth in the body of the press, with simple means for reciprocating the plunger, means actuated by the movement of the plunger for positioning wires in the press to encircle the bales and to twist the ends of the wires together, with the principal parts enclosed so that they are protected from dust and other foreign matter and may operate in lubricant.

Another object of the invention is to provide means whereby the press can be adjusted to make bales of different sizes and also to provide means for chopping the hay as it enters the press so that the chopped hay is baled immediately after being chopped.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a side elevational view of the invention.

Figure 2 is a top plan view thereof and showing a portion of a tractor with drive means leading from the tractor to certain parts of the apparatus.

Figure 3 is a fragmentary horizontal sectional view taken substantially on the line 3—3 of Figure 1.

Figure 4 is a transverse sectional view through the approximate center of the press taken substantially on a line 4—4 of Figure 2 and showing the means for reciprocating the plunger.

Figure 5 is a section on the line 5—5 of Figure 4.

Figure 6 is a vertical longitudinal sectional view through the central part of the press box and through the plunger showing a different form of cutting means from that shown in the other view.

In these drawings, the letter A indicates the supporting structure as a whole, and said structure is provided with the front wheels 1 and the rear caster wheels 2. Figure 2 shows the implement being propelled through means of a tractor a part of which is shown at T, the tractor being suitably connected with the implement, such as by the beams 3, though it is to be understood that the implement can be propelled in any suitable or desired manner. The press box is shown generally at B and extends at right angles to the direction of travel of the apparatus. The box includes the central portion B' formed with a bottom and side walls and the two end portions B", each of which is formed with top and bottom parts 5 of resilient material and yieldingly connected together by the bolts 6 passing through upper and lower cross bars 6', the bolts carrying the springs 7 and nuts 8 so that the top and bottom parts can be adjusted toward and away from each other in the usual manner.

The reciprocatory plunger is shown at 9 and operates in the part B' of the box. The side edges of this plunger 9 are formed with the recesses 10 for clearing the usual retainers 11 arranged in each end of the part B' of the box. The retainers are carried by the free ends of hinged strips 12 which are pressed inwardly by the springs 13 on the bolts 14, see Figure 3. These retainers project into the box to prevent retrograde movement of the bales when they are being formed by the plunger. The side edges of the plunger are also formed with the small grooves 15, see Figure 4, for receiving the binding wires.

As before stated this plunger moves back and forth in the press box and forms a pair of bales simultaneously. Upper and lower rack bars 16 are attached to the side edges of the plunger and these bars pass through longitudinally extending slots 17 in the side walls of the central portion of the box, this arrangement being shown more clearly in Figure 6.

These racks are engaged by the toothed wheels 18 on the vertical shafts 19, one of which is arranged at each side of the central part of the box. These shafts are journaled in the parts 20 and shafts pass through portions of vertical parts of a housing H. Each shaft 19 is driven from a stub shaft 21 through means of the gears 22. Each stub shaft has a pinion 23 attached to its inner end, said pinion operating in an annular groove 24 in a wheel 25 rotatably supported in the housing by a shaft 26. Each wheel 25 is constructed in accordance with my Patent No. 2,294,929 and has teeth 27 on substantially half of the circumference of one side wall of the groove and teeth 28 on substantially half of the other side wall of the groove, the two sets of teeth 27 and 28 being arranged on opposite halves of the two side walls, with the end teeth of the two sets spaced apart a sufficient distance so that the pinion 23 will not engage the two sets simultaneously. Each wheel 25 has on its circumference an annular set of teeth 29 which are engaged by a pinion 30 on a shaft 31. The shaft 31 is journaled in the housing H and has a large wheel 32 attached to its outer end which is suitably driven from a motor M on the implement. Motion of one wheel 25 is communicated to the other wheel 25 through means of a shaft 33 journaled in the bottom of the housing H and having gears 34 on its ends, one of which meshes with the gear teeth 29 of one wheel 25 and the other with the similar teeth 29 of the other wheel 25 as shown in Figure 4.

Thus the rotary movement of the two wheels 25, through the shafts 21, gears 22, toothed wheels 18 and the racks 16, causes reciprocatory motion of the plunger to make the plunger form bales at both end parts of the box simultaneously. Of course, the parts will be moved in a direction to move the plunger in one direction, when the pinions 23 are engaging the teeth 27 and then as the pinions 23 leave the teeth 27 they will engage the teeth 28 which reverses the motion of the pinions 23 and thus the parts are caused to move the plunger in an opposite direction. As before stated there is sufficient space between the two sets of teeth 27 and 28 to permit the pinions to practically stop rotating before they engage the second set of teeth. This action of reversing the movement of the plunger is performed without jerking, for as the plunger nears the end of its stroke it is pressing upon the hay in the bale which tends to force the plunger in the opposite direction. As the pinions 23 pass from one set of teeth in the grooves of the wheels 25, the pressure of the hay on the plunger tends to move the parts to cause the pinions to start rotating in an opposite direction, so that as the pinions are engaged by the other set of teeth they are moved in the same direction in which the pressure of the hay on the plunger tends to rotate them, and thus the change is made without shock or jar or any jerking movement of the parts. The plunger operating mechanism is used in conjunction with the bale tying apparatus supported on the pair of side frame members 35 as covered in my prior patent identified above.

I also provide means for chopping the hay being introduced into the central portion of the box and such means includes a knife carrying reel 125 placed over the central portion of the box and the blades of which cooperate with a stationary blade 126 at the upper edge of the side of the central portion of the box over which the hay passes so that when this reel is rotated it will cut the hay entering the apparatus and before it drops into the box where it is engaged by the plunger. This reel is preferably driven from the tractor, when the tractor is arranged as shown in Figure 2 through means of the shafting and gearing shown generally at 127, the shaft 127' engaging and being connected with a take-off shaft of the tractor. A hood 128 covers the upper end of the central portion of the box and has its front open to receive the hay from conveying mechanism shown generally at 129 which picks up the hay from the windrows and conveys the hay or other material into the open mouth of the hood where the hay is engaged by the cutting means so that it is chopped before dropping into the box where it is engaged by the plunger 9 for forming the hay into bales as before described.

Instead of providing the reel 125 for chopping the hay into short lengths I may provide the cutting means shown in Figure 6, which means includes a knife 130 on the top of the plunger 9 which engages the hay dropping into the central portion of the box and cuts the same as the plunger is reciprocating back and forth in the box, the hay being introduced through the open top 131 of the box when the hay is cut by the knife as the plunger passes across the opening. As will be seen in Figure 6 the knife has both edges beveled so that the knife will cut on both strokes of the plunger.

The housing encloses the major portion of the movable parts of the apparatus so as to protect the same from dirt and dust and other foreign matter and the housing contains lubricant so that the parts are thoroughly lubricated.

The conveyor 129 can be driven from a portion of the drive means 127 as shown at 133 in Figure 1.

The plunger 9 reciprocates smoothly and without jerks as the pressure of the material being baled tends to start the plunger on its return stroke so that this pressure of the material on the plunger tends to cause the gearing to reverse to drive the plunger on its return stroke, such as the pinions 23 engaging the two sets of teeth 27 and 28 on opposite sides of the grooves 24 of the wheels 25.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A baling apparatus of the class described comprising a supporting structure, an elongated press box carried by the structure and including an intermediate portion and bale receiving end portions, a plunger reciprocable in the intermediate portion for pressing material into bales in the end portions, rack bars connected with the sides of the plunger, a vertical shaft supported for rotary movement at each side of the intermediate portion of the box, gears on said shafts meshing with the rack bars, a pair of vertically arranged wheels, one at each side of the intermediate part of the box, means for rotating one wheel, means for rotating the other wheel from the first wheel, each wheel having a circumferentially arranged groove therein, said groove having teeth on a part of one side wall thereof and the other side wall having teeth on another part thereof, a stub shaft for each wheel, a pinion on said stub shaft located in the groove and engageable first by the teeth on one side wall and then by the teeth on the opposite side wall, whereby the stub shaft is driven first in one direction and then in the opposite direction, and gears for connecting the stub shafts with the first-mentioned shafts for reciprocating the plunger, the pressure of the material being baled on the plunger facilitating the reversing of the parts at the end of each stroke of the plunger and causing each pinion to be engaged by one set of teeth after it has left the other set smoothly.

2. A baling apparatus of the class described comprising a supporting structure, an elongated press box carried by the structure and including an intermediate portion and bale receiving end portions, a plunger reciprocable in the intermediate portion for pressing material into bales in the end portions, rack bars connected with the sides of the plunger, a vertical shaft supported for rotary movement at each side of the intermediate portion of the box, gears on said shafts meshing with the rack bars, a pair of vertically arranged wheels, one at each side of the intermediate part of the box, means for rotating one wheel, means for rotating the other wheel from the first wheel, each wheel having a circumferentially arranged groove therein, said groove having teeth on a part of one side wall thereof and the other side wall having teeth on another part thereof, a stub shaft for each wheel, a pinion on said stub shaft located in the groove and engageable first by the teeth on one side wall and then by the teeth on the opposite side wall, whereby the stub shaft is driven first in one direction and then in the opposite direction, gears for connecting the stub shafts with the first-mentioned shafts for reciprocating the plunger, the pressure of the material being baled on the plunger facilitating the reversing of the parts at the end of each stroke of the plunger and causing each pinion to be engaged by one set of teeth after it has left the other set smoothly, the means for rotating the second wheel from the first wheel including annular gears on the two wheels, a shaft, gears at the ends of the shaft engaging the annular gears, a pinion engaging the annular gear of said first wheel, and a housing enclosing the wheels and the gearing and containing lubricant.

RALPH A. OPENSHAW.